United States Patent
Batten et al.

(10) Patent No.: US 11,822,378 B1
(45) Date of Patent: Nov. 21, 2023

(54) CONTROL PANEL ASSEMBLIES HAVING ROTATABLE INPUT DEVICES

(71) Applicant: Hewlett-Packard Development Company, L.P., Spring, TX (US)

(72) Inventors: Douglas Matthew Batten, Boise, ID (US); Michael Van Leman, Boise, ID (US); Clinton Troy Jensen, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/738,702

(22) Filed: May 6, 2022

(51) Int. Cl.
 *G06F 1/16* (2006.01)
 *G06F 3/041* (2006.01)
(52) U.S. Cl.
 CPC ............ *G06F 1/1601* (2013.01); *G06F 3/041* (2013.01)
(58) Field of Classification Search
 CPC .................. G06F 3/041; G06F 1/1601; H05K 7/1485–1494
 See application file for complete search history.

(56) References Cited

U.S. PATENT DOCUMENTS

| 6,781,823 B1* | 8/2004 | Nyack | G06F 1/1654 361/679.17 |
| 2006/0289370 A1* | 12/2006 | Shih | H05K 7/1494 211/26 |
| 2023/0021732 A1* | 1/2023 | Radcliffe | F16M 11/10 |
| 2023/0049571 A1* | 2/2023 | Hobbs | G06F 1/16 |

FOREIGN PATENT DOCUMENTS

CN 105937549 B * 8/2018 ........... G06F 1/1618

* cited by examiner

*Primary Examiner* — James Wu
(74) *Attorney, Agent, or Firm* — Brooks, Cameron & Huebsch, PLLC (57) ABSTRACT

According to examples, an apparatus may include a body and a control panel assembly coupled to the body. The control panel assembly may include a base plate coupled to the body, a display panel coupled to the base plate, and an input device coupled to the display panel. In some examples, the control panel assembly may move from a first position in which the display panel is at least partially retracted in the body to a second position in which the display panel and the input device are extended out from the body. The display panel may be positioned at a first predefined angle relative to the base plate and the input device may be positioned at a second predefined angle relative to the display panel.

18 Claims, 4 Drawing Sheets

CONTROL PANEL ASSEMBLIES HAVING ROTATABLE INPUT DEVICES

BACKGROUND

Electronic devices, such as imaging devices, may have control panels that may be mounted on the electronic devices. In some instances, the control panels may be movable, which may allow display angles of the control panels to be changed.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the principles of the present disclosure are described by referring mainly to examples thereof. In the following description, numerous specific details are set forth in order to provide an understanding of the examples. It will be apparent, however, to one of ordinary skill in the art, that the examples may be practiced without limitation to these specific details. In some instances, well known methods and/or structures have not been described in detail so as not to unnecessarily obscure the description of the examples. Furthermore, the examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

Many types of imaging devices, such as multifunction printers, may include control panels. Control panels may provide, for instance, a graphical interface through which users may be provided with graphical information. The control panels may also provide the graphical interface to enable the users to interact with the printing devices, for instance, through touch input. In some examples, the control panels may be movable to, for instance, reduce the size, e.g., footprints, of the imaging devices. The sizes of the printing devices may be reduced to make shipping and/or movement of the printing devices simpler and more efficient. In some instances, retractable or "slide-out" control panel designs may provide improved aesthetics due to elimination of the relatively large "nosecones" that non-sliding control panel designs would be mounted to in certain multifunction printer designs.

In some examples, external hardware devices, such as physical keyboards, keypads, touch pads, network devices, a base for a hardware device, and/or the like, may be used in addition to the control panels. In some instances, the nosecones to which the control panels would be mounted may be used to house the external hardware devices. As such, a disadvantage in eliminating the nosecones may be that the storage space to house the external hardware devices is lost.

Disclosed herein are control panel assemblies that may be movable between retracted positions and extended positions. Also discussed herein are apparatuses, such as imaging devices, that include the control panel assemblies. Particularly, disclosed herein are control panel assemblies that include display panels and input devices connected directly to the display panels, such as keyboards, keypads, touch pads, network devices, a base for a hardware device, and/or the like.

As discussed herein, a control panel assembly may be coupled to a body of an electronic device, such as an imaging device. The control panel assembly may include a base plate coupled to the body and a display panel rotatably coupled to the base plate. An input device, such as a keyboard, may be rotatably coupled to the display panel. In some examples, the control panel assembly may move from a first position in which the display panel is retracted in the body to a second position in which the display panel and the input device are extended out from the body. The display panel may be rotatable relative to the base plate and the input device may be rotatable relative to the display panel.

Figure 1A:
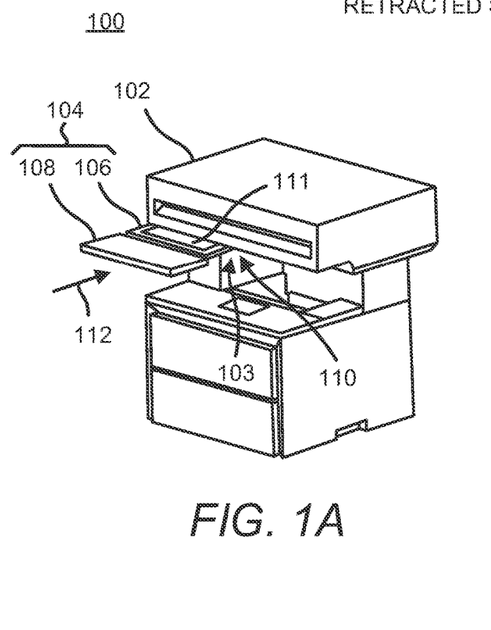
FIG. 1A shows a perspective view of an example apparatus having a control panel assembly in a retracted state, in which a display panel may be partially retracted in a body, and an input device coupled to the display panel.
Figure 1B:
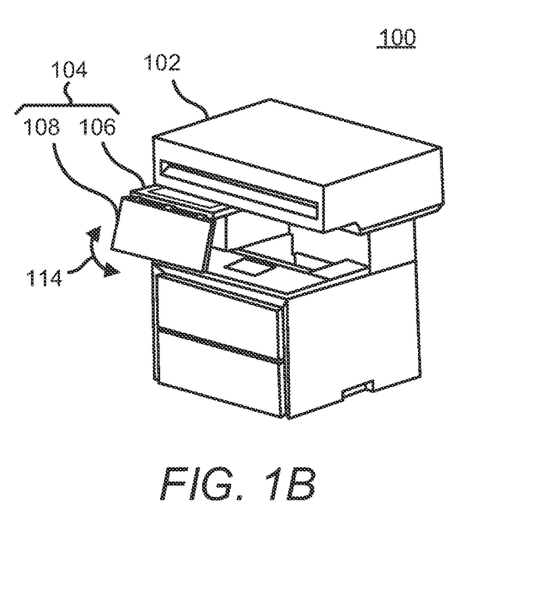
FIG. 1B shows a perspective view of the example apparatus depicted in FIG. 1A, in which the control panel assembly is in the retracted state and the input device may be positioned at a first predefined angle relative to the display panel.
Figures 1C, 1D:
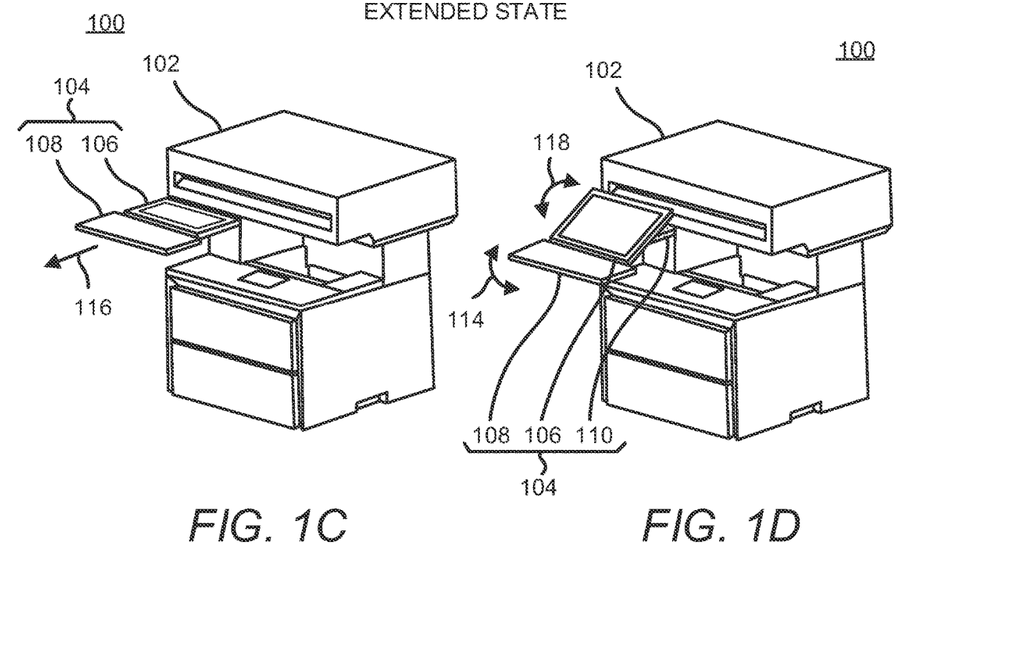
FIG. 1C shows a perspective view of the example apparatus depicted in FIG. 1A, in which the control panel assembly is in an extended state, in which the display panel and the input device are extended out from the body.
FIG. 1D shows a perspective view of the example apparatus depicted in FIG. 1C, in which the control panel assembly is in the extended state, and the display panel may be positioned at a second predefined angle relative to the body and the input device may be positioned at the first predefined angle relative to the display panel.

Reference is first made to FIGS. 1A to 1D, which respectively show different positions of an example control panel assembly. FIG. 1A shows a perspective view of an example apparatus 100 having a control panel assembly 104 in a retracted state, in which a display panel 106 may be partially retracted in a body 102, and an input device 108 coupled to the display panel 106. FIG. 1B shows a perspective view of the example apparatus 100 depicted in FIG. 1A, in which the control panel assembly 104 is in the retracted state and the input device 108 may be positioned at a first predefined angle relative to the display panel 106. FIG. 1C shows a perspective view of the example apparatus 100 depicted in FIG. 1A, in which the control panel assembly 104 is in an extended state, in which the display panel 106 and the input device 108 are extended out from the body 102. FIG. 1D shows a perspective view of the example apparatus 100 depicted in FIG. 1C, in which the control panel assembly 104 is in the extended state, and the display panel 106 may be positioned at a second predefined angle relative to the body 102 and the input device 108 may be positioned at the first predefined angle relative to the display panel 106. It should be understood that the example apparatus 100 may include additional features and that some of the features described herein may be removed and/or modified without departing from the scope of the example apparatus 100.

As shown in FIG. 1A, the apparatus 100 may include the body 102 and the control panel assembly 104, which may be in a retracted state. The control panel assembly 104 may be coupled to the body 102. The control panel assembly 104 may include the display panel 106, the input device 108 coupled to the display panel 106, and a base plate 110, which may support the display panel 106 and the input device 108.

In some examples, the input device 108 may be an external hardware device, such as a keyboard, a keypad, a touch pad, a touch screen display panel, a network device, a base for a hardware device, and/or the like. In some examples, the base for a hardware device may be a frame or housing to which an external hardware device may be physically mounted. The base may have a recess having a predefined shape to receive a certain external hardware device. The base may include a data connection port, such as a USB port, a data cable, and/or the like, to electrically connect the external hardware device. The external hardware device may be mounted to the display panel 106 of the control panel assembly 104 via the base.

In some examples, a single input device 108 or multiple input devices 108 may be connected to the display panel 106. For instance, in case the input device 108 is a keyboard, a width of the keyboard may be similar to a width of the display panel 106. In this instance, it may be difficult to connect additional input devices 108 in addition to the keyboard due to the limited space. In other instances, for input devices 108 that have widths that are less than the width of the display panel 106, such as keypads, touch pads, a base for a hardware device, or the like, a sufficient amount of space may be available to accommodate another input device 108. In these instances, multiple input devices 108 may be connected to the display panel 106.

The base plate 110 may be slideably coupled to the body 102. In some examples, the base plate 110 may include a sliding mechanism that allows the base plate 110 to slide in a direction indicated by the arrow 112 to retract into the body 102. The display panel 106 may be coupled to a distal end of the base plate 110 to allow lateral movement of the display panel 106 in the direction of the arrow 112. The body 102 may include a recess 103 to accommodate the base plate 110 and the display panel 106 in the retracted state. In some examples, the recess 103 may be an enclosed recess, which may include an opening having a shape that matches a shape of the control panel assembly. For instance, the shape of the opening may match a cross-sectional shape of the display panel 106 and the base plate 110, through which the control panel assembly 104 may be inserted into the body 102.

In some examples, in the retracted state, the display panel 106 may be retracted to a first position in which the display panel 106 is at least partially retracted in the body 102. In the first position, a front surface 111 of the display panel 106 may face upwards such that at least a portion of the display panel 106 may be visible. The display panel 106 may display a modified graphical user interface based on a size of the visible area of the display panel 106. As such, the display panel 106 may display information even when the display panel 106 is stowed in the retracted state. The modified graphical user interface that is displayed in the retracted state may, for instance, provide space savings, improved access to print outputs, a simplified user interface for commonly used features, and/or the like. In some examples, the display panel 106 may be partially retracted at various predefined depths, for instance, correlated to different sizes of the visible/active area of the display panel 106, or the display panel 106 may be fully retracted into the body 102, in which case the display panel 106 may be inactive.

The input device 108 may be coupled to the display panel 106. The input device 108 may be coupled to a distal edge of the display panel 106, such that the input device 108 may slide laterally together with the display panel 106. The input device 108 may be positioned at a certain predefined angle relative to the base plate 110. As shown in FIG. 1B, the input device 108 may be rotatable relative to the display panel 106 in a direction indicated by the arrow 114. In some examples, the input device 108 may be coupled to the front or leading edge of the display panel 106, and may be rotated to be positioned at various angles relative to the display panel 106. In some examples, the input device 108 may be fixed at a certain predefined angle relative to the base plate 110.

As shown in FIG. 1C, the control panel assembly 104 may be moved in a direction indicated by the arrow 116 to be in an extended state. The control panel assembly 104 may be moved from the first position in which the display panel 106 is at least partially retracted in the body 102 to a second position in which the display panel 106 and the input device 108 are extended out from the body 102. In the extended state, the display panel 106 may be fully exposed and visible, and a full size graphical user interface may be displayed on the display panel 106. The full size graphical user interface may provide access to features which may not be available in the modified graphical user interface depicted in FIGS. 1A and 1B, for instance, to provide a greater level of control over settings of the apparatus 100, advanced editing functions, such as a preview function or an edit function displayed directly on the full size graphical user interface, and/or the like.

As shown in FIG. 1D, the display panel 106 may be positioned at a first predefined angle relative to the base plate 110 and the input device 108 may be positioned at a second predefined angle relative to the display panel 106. The angular positions of the display panel 106 and the input device 108 may be fixed at respective fixed angles, may be moved to a set of predefined angles, or may be moved within a range of angles. In some examples, in the extended state, both the display panel 106 and the input device 108 may be independently rotated, for instance, based on user preferences for viewing angles. As such, the display panel 106 and/or the input device 108 may be rotated to provide different viewing angles, for instance, for relatively tall users, for users in wheelchairs, and/or the like. The display panel 106 may be rotatable relative to the base plate 110 to change viewing angles of the display panel 106, as indicated by the arrow 118. In some examples, the display panel 106 may be rotatable to certain predefined angles relative to the base plate 110 and the body 102. The display panel 106 may also be adjustable to any angle within a range of angles. The input device 108 may be rotatable to be positioned in an extended position, as indicated by the arrow 114, in which the input device 108 may be extended at a certain angular range relative to the display panel 106.

Figure 2A:
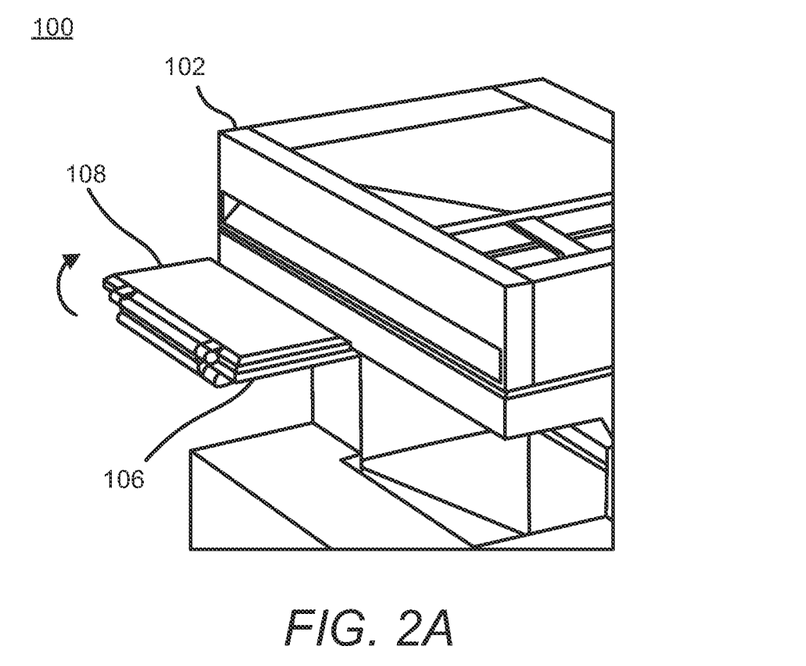
FIG. 2A depicts an enlarged perspective view of the example apparatus depicted in FIG. 1A, in which the input device is stowed adjacent to a front surface of the display panel.
Figure 2B:
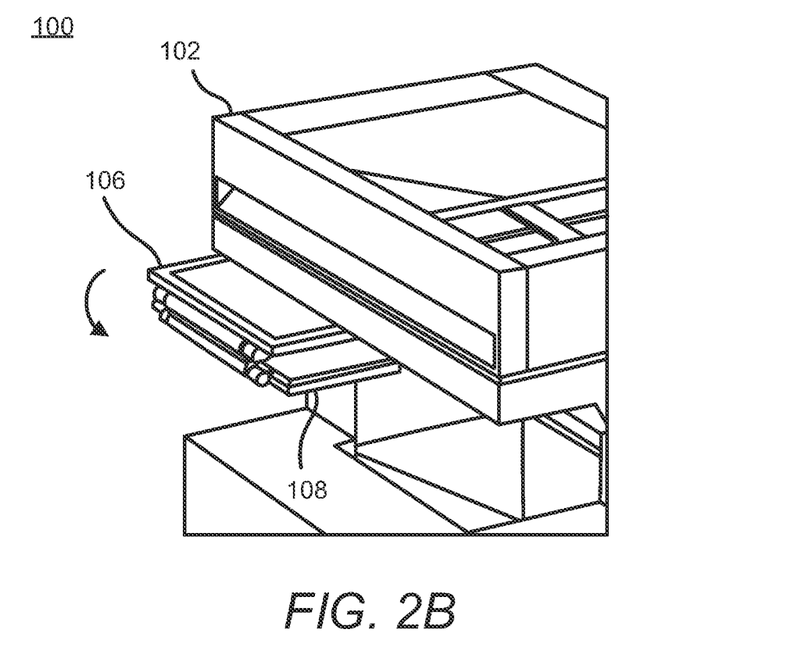
FIG. 2B depicts an enlarged perspective view of the example apparatus depicted in FIG. 1A, in which the input device is stowed adjacent to a rear surface of the display panel.

Reference is now made to FIGS. 2A and 2B. FIG. 2A depicts an enlarged perspective view of the example apparatus 100 depicted in FIG. 1A, in which the input device 108 is stowed adjacent to the front surface 111 of the display panel 106. FIG. 2B depicts an enlarged perspective view of the example apparatus 100 depicted in FIG. 1A, in which the input device 108 is stowed adjacent to a rear surface 120 of the display panel 106. It should be understood that the example apparatus 100 as depicted in FIGS. 2A and 2B may include additional features and that some of the features described herein may be removed and/or modified without departing from the scope of the example apparatus 100.

As shown in FIG. 2A, the input device 108 may be stowed on the front surface 111 of the display panel 106. The input device 108 may be stowed while the display panel 106 is in the extended state or in the retracted state. For instance, the input device 108 may be positioned outside of the body 102 of the apparatus 100 when stowed on the front surface 111. In some instances, a size of the input device 108 may correlate to a size of the exposed portion of the display panel 106, such that the input device 108 may cover the partially visible area of the display panel 106 in the retracted state.

In some instances, a size of the input device 108 may be larger than the exposed portion of the display panel 106. In these instances, when the input device 108 is stowed on the front surface 111 of the display panel 106, the amount in which the control panel assembly 104 may be retracted into the body 102 may be limited by the size of the input device 108.

In some examples, at least a portion of the input device 108 may be retracted into the body 102 of the apparatus 100, together with the display panel 106, when the input device 108 is stowed on the front surface 111. For instance, the opening of the recess 103 may be able to accommodate both the display panel 106 and the input device 108. When the input device 108 is stowed on the front surface 111 to cover the display panel 106, the display panel 106 may be made inactive, such as being placed in a sleep mode or powered off.

As shown in FIG. 2B, the input device 108 may be stowed adjacent to a rear surface 120 (FIG. 3) of the display panel 106. The input device 108 may be rotated downward, for instance, such that the input device 108 is positioned under the display panel 106, substantially parallel to the display panel 106.

Figure 3:
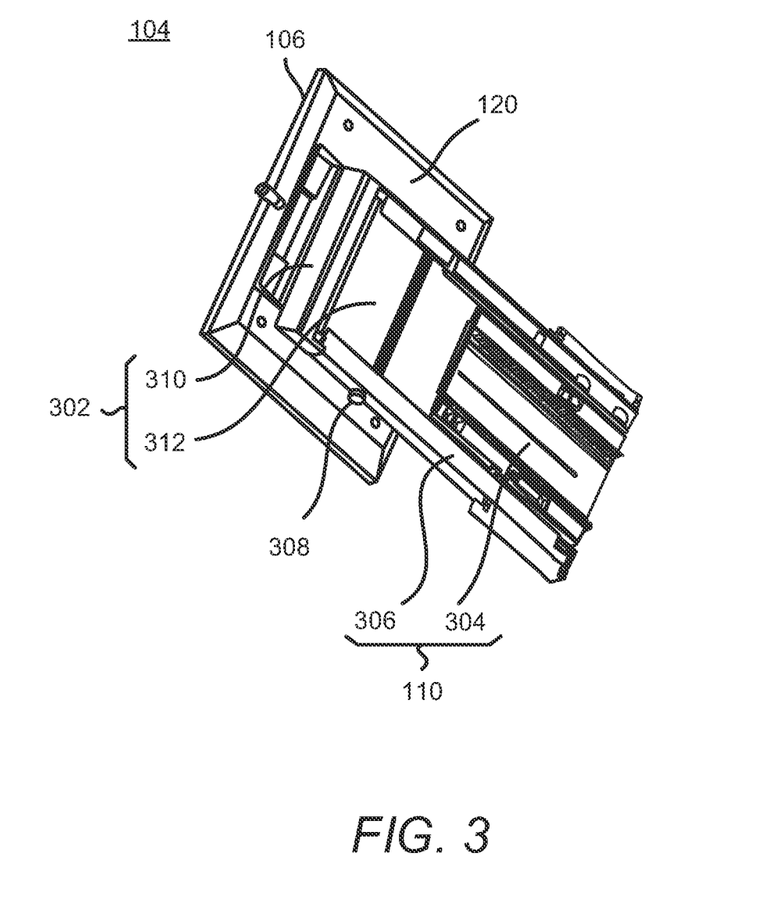
FIG. 3 depicts a bottom perspective view of a portion of an example control panel assembly depicted in FIG. 1, which may include a first hinge assembly and a base plate, the first hinge assembly to rotatably couple the display panel to the base plate.
Figure 4A:
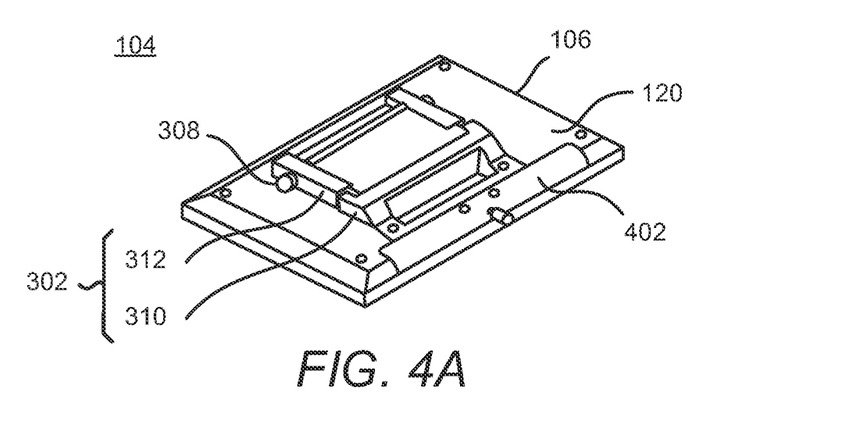
FIG. 4A depicts a bottom perspective view of an example display panel depicted in FIG. 1A, which may include a cover that covers a recess on a rear surface of the display panel to mount the input device.
Figure 4B:
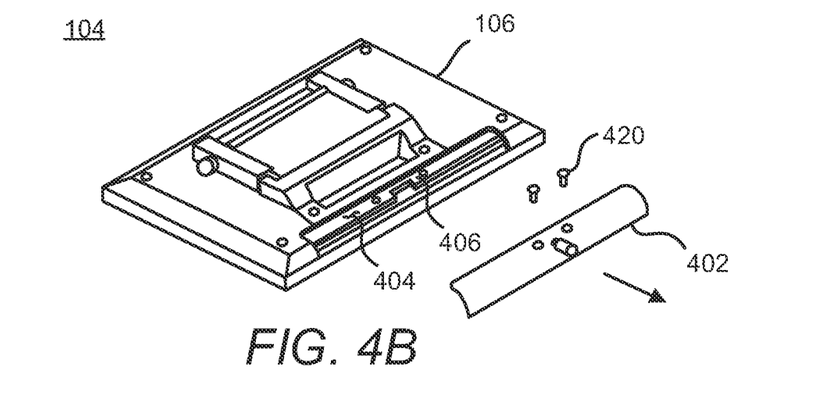
FIG. 4B depicts a bottom perspective view of the display panel depicted in FIG. 4A, which may include the cover and the recess on the rear surface of the display panel, in which the cover is removed to expose the recess.
Figure 4C:
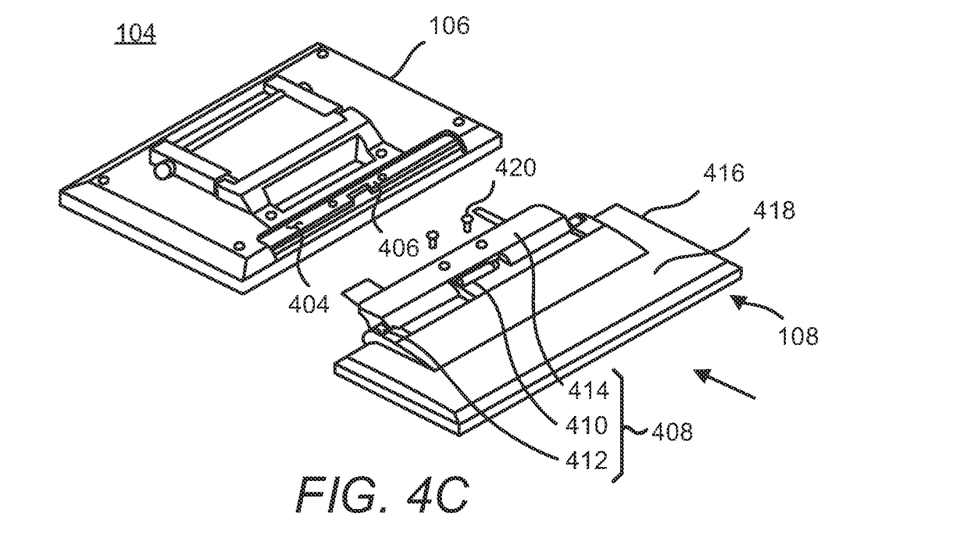
FIG. 4C depicts a bottom perspective view of the display panel depicted in FIG. 4B, which may include a second hinge assembly that includes a mounting plate to be removably attached to the display panel at the recess.

Reference is now made to FIGS. 3, 4A, 4B, and 4C. FIG. 3 depicts a bottom perspective view of a portion of the control panel assembly 104, which may include a first hinge assembly 302 and the base plate 110, the first hinge assembly 302 to rotatably couple the display panel 106 to the base plate 110. FIG. 4A depicts a bottom perspective view of an example display panel 106, which may include a cover 402 that covers a recess 404 on the rear surface 120 of the display panel 106 to mount the input device 108. FIG. 4B depicts a bottom perspective view of the display panel depicted in FIG. 4A, which may include the cover 402 and the recess 404 on the rear surface 120 of the display panel 106, in which the cover 402 is removed to expose the recess 404. FIG. 4C depicts a bottom perspective view of the display panel 106 depicted in FIG. 4B, which may include a second hinge assembly 408 that includes a mounting plate 414 to be removably attached to the display panel 106 at the recess 404. It should be understood that the example control panel assembly 104 depicted in FIG. 3 and the example display panel 106 depicted in FIGS. 4A, 4B, and 4C may include additional features and that some of the features described herein may be removed and/or modified without departing from the scope of the example control panel assembly 104 or the example display panel 106.

As shown in FIG. 3, the control panel assembly 104 may include the base plate 110 to support the display panel 106. The base plate 110 may be slideably coupled between the body 102 and the display panel 106 to allow lateral movement of the control panel assembly 104. In some examples, the base plate 110 may include a slide mechanism that includes a fixed plate 304 to be fixed to the body 102 and a slide plate 306 that may be positioned in a sliding arrangement relative to the fixed plate 304. A distal end of the slide plate 306 may be connected to the display panel 106.

The base plate 110 may be removably coupled to the display panel 106. In some examples, the base plate 110 may be connected to the display panel 106 via a connector 308. The connector 308 may include various types of connectors, such as spring loaded pins, which may allow installation and removal of the display panel 106 without tools, screws, friction fit connectors, notch/tab connector pairs, and/or the like.

The control panel assembly 104 may include the first hinge assembly 302 connected between the rear surface 120 of the display panel 106 and the base plate 110. In some examples, a distal end of the slide plate 306 of the base plate 110 may be coupled to the first hinge assembly 302.

The first hinge assembly 302 may rotatably couple the display panel 106 to the base plate 110. In some examples, the first hinge assembly 302 may include a first hinge 310 to control rotational movement of the display panel 106 relative to the base plate 110 and a mounting assembly 312 rotatably coupled to the first hinge 310. The body of the first hinge 310 may be fixed to the rear surface 120 of the display panel 106 or may be an integral part of the rear surface 120.

In some examples, the mounting assembly 312 may have a predefined shape that matches a shape of the slide plate 306, such that a distal end of the mounting assembly 312 may be inserted into a distal end of the slide plate 306. In some examples, the mounting assembly 312 may include the connector 308 to removably mount the base plate 110 to the display panel 106.

The input device 108 may be removably attached to the display panel 106. In some examples, the input device 108 may be mounted to the rear surface 120 of the display panel 106. In some examples, the rear surface 120 of the display panel 106 may have connections to mount the display panel 106. For instance, a mounting surface 406 may be disposed on the rear surface 120 of the display panel 106. In some instances, the mounting surface 406 may be hidden inside the recess 404, and the cover 402 may be disposed to cover the recess 404 when the mounting surface 406 is not being used.

In some examples, the control panel assembly 104 may include the second hinge assembly 408 connected between the display panel 106 and the input device 108. The second hinge assembly 408 may rotatably couple the input device 108 to the display panel 106. In some examples, the second hinge assembly 408 may include a first hinge 410, at least one second hinge 412, and the mounting plate 414 rotatably coupled to the input device 108 via the first hinge 410 and the second hinge 412.

The first hinge 410 may control rotational movement of the input device 108 relative to the display panel 106. In some examples, the first hinge 410 may be a friction hinge.

The first hinge 410 may exert asymmetric forces, for instance, in a downward rotational direction of the input device 108 and an upward rotational direction of the input device 108. For instance, to account for the weight of the input device 108, the first hinge 410 may exert a force against the downward rotational direction of the input device 108, where the force may be stronger than a force against the upward rotational direction of the input device 108.

The second hinge 412 may be disposed a predetermined distance from the first hinge 410. The second hinge 412 may align the input device 108 relative to the display panel 106, for instance to prevent twisting and misalignment between the input device 108 and the display panel 106. In some examples, at least one second hinge 412 may be disposed. For instance, a pair of second hinges 412 may be disposed at opposite sides of the first hinge 410.

The mounting plate 414 may be rotatably coupled to the input device 108 via the first hinge 410 and the second hinge 412. The mounting plate 414 may be attached to a body 416 of the input device 108, for instance, on a rear surface 418 of the input device 108. The mounting plate 414 may be mounted to the mounting surface 406. In some examples, the mounting plate 414 may have a shape that may be substantially the same as a shape of the cover 402. The mounting plate 414 may be disposed over the recess 404, in lieu of the cover 402, and removably attached to the display panel 106 at the recess 404. In some examples, the mounting plate 414 may be fixed in place at the recess 404 via connectors 420. The connectors 420 may be screws, pins, and/or the like. The connectors 420 may be used to attach the cover 402 to cover the recess 404, for instance, in cases in which an input device 108 is not coupled to the display panel 106.

According to examples, a control panel assembly, such as the control panel assembly 104 depicted in FIGS. 1A to 4C, may include the base plate 110, the display panel 106, the first hinge assembly 302, the input device 108, and the second hinge assembly 408. The base plate 110 may be retractable from the body 102 of an electronic device, such as the apparatus 100 depicted in FIGS. 1A to 2B. In some examples, the first hinge assembly 302 may rotatably couple the display panel 106 to the base plate 110. The second hinge assembly 408 may rotatably couple the input device 108 to the display panel 106. The display panel 106 may move from a first position in which the display panel 106 is at least partially retracted in the body 102 to a second position in which the display panel 106 and the input device 108 are extended out from the body 102 of the electronic device. In some examples, the display panel 106 may be rotatable relative to the base plate 110 and the input device 108 may be rotatable relative to the display panel 106.

In some examples, the input device 108 may include the mounting plate 414 that may be rotatably coupled to the body 416 of the input device 108. The display panel 106 may include the recess 404 to accommodate the mounting plate 414. The mounting plate 414 may be removably attached to the display panel 106 at the recess 404. The recess 404 may be covered by the cover 402 when the input device 108 is not coupled to the display panel 106. In some examples, the input device 108 may be an external hardware device, such as a physical keyboard, a keypad, a touch pad, a touch screen display panel, a network device, a base for a hardware device, or a combination thereof.

According to examples, an imaging device, such as the apparatus 100 depicted in FIGS. 1A to 1D and 2A to 2B, may include the body 102 having the recess 103 and the control panel assembly 104 slideably coupled to the body 102. The control panel assembly 104 may include the base plate 110, the display panel, and the input device 108.

The base plate 110 may be slideably coupled to the body 102 to extend from the recess 103 of the body 102. The display panel 106 may be rotatably coupled to the base plate 110. In some examples, the display panel 106 may include the mounting assembly 312 rotatably coupled to the display panel 106 via the first hinge 310. The display panel 106 may be removably attached to the base plate 110 via the mounting assembly 312.

The input device 108 may be rotatably coupled to the display panel 106. In some examples, the input device 108 may include the mounting plate 414 rotatably coupled to the input device 108 via the second hinge 412. The input device 108 may be removably attached to the display panel 106 via the mounting plate 414.

The input device 108 may be rotatable to be positioned in an extended position, in which the input device 108 is extended at a certain angular range relative to the display panel 106, and a retracted position, in which the input device 108 may be stowed adjacent to the front surface 111 of the display panel 106 or the rear surface 120 of the display panel 106.

The display panel 106 may include the recess 404 to accommodate the mounting plate 414. The mounting plate 414 may be removably attached to the display panel 106 at the recess 404. In some instances, the recess 404 may be covered by a cover 402 when the input device 108 is not coupled to the display panel 106.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
   a body; and
   a control panel assembly coupled to the body, the control panel assembly comprising:
   a base plate coupled to the body;
   a display panel coupled to the base plate; and
   an input device coupled to the display panel, the control panel assembly to move from a first position in which the display panel is at least partially retracted in the body to a second position in which the display panel and the input device are extended out from the body, wherein:
   the display panel is positioned at a first predefined angle relative to the base plate and the input device is positioned at a second predefined angle relative to the display panel;
   while the display panel is partially retracted in the body, a modified graphical user interface (GUI) is displayed on a visible portion of the display panel, the modified GUI, being sized based on the visible portion of the display panel, to provide access to features on the display panel; and while the display panel is fully extended out from the body, a full size GUI is displayed on the display panel.

2. The apparatus of claim 1, wherein the control panel assembly further comprises:
   a first hinge assembly connected between the display panel and the base plate to rotatably couple the display panel to the base plate; and
   a second hinge assembly connected between the display panel and the input device to rotatably couple the input device to the display panel.

3. The apparatus of claim 2, wherein the first hinge assembly comprises:
   a first hinge to control rotational movement of the display panel relative to the base plate; and
   a mounting assembly rotatably coupled to the first hinge, the mounting assembly comprising a connector to removably mount the base plate to the display panel.

4. The apparatus of claim 2, wherein the second hinge assembly comprises:
   a first hinge to control rotational movement of the input device relative to the display panel, the first hinge being a friction hinge to exert asymmetric forces in a downward rotational direction of the input device and an upward rotational direction of the input device.

5. The apparatus of claim 4, wherein the second hinge assembly comprises:
   at least one second hinge disposed a predetermined distance from the first hinge, the at least one second hinge to align the input device relative to display panel.

6. The apparatus of claim 1, wherein the base plate is slideably coupled to the body to extend and retract the control panel assembly relative to the body, and wherein the input device is rotatable to be positioned in an extended position, in which the input device is extended at a certain angular range relative to the display panel, and a retracted position, in which the input device is stowed adjacent to a front surface of the display panel or a rear surface of the display panel.

7. The apparatus of claim 1, wherein the input device is removably attached to the display panel.

8. The apparatus of claim 7, wherein:
   the input device comprises a mounting plate, the mounting plate being rotatably coupled to a body of the input device; and
   the display panel comprises a recess to accommodate the mounting plate, the mounting plate to be removably attached to the display panel at the recess, wherein the recess is to be covered by a cover when the input device is not coupled to the display panel.

9. The apparatus of claim 1, wherein the input device is a keyboard, a keypad, a touch pad, a touch screen display panel, a network device, a base for a hardware device, or a combination thereof.

10. The apparatus of claim 1, wherein the full size GUI provides access to features not available to the modified GUI to provide a greater level of control while utilizing the full size GUI.

11. The apparatus of claim 1, wherein the display panel is fully retracted into the body and the display panel is inactive.

12. The apparatus of claim 1, wherein the input device is stowed on a front surface of the display panel and a size of the input device correlates with a size of the visible portion of the display panel while the display panel is partially retracted in the first position.

13. A control panel assembly comprising:
   a base plate to be retractable from a body of an electronic device;
   a display panel;
   a first hinge assembly to rotatably couple the display panel to the base plate;
   an input device; and
   a second hinge assembly to rotatably couple the input device to the display panel, the display panel to move from a first position in which the display panel is at least partially retracted in the body to a second position in which the display panel and the input device are extended out from the body of the electronic device, wherein:
      while the display panel is partially retracted in the body, a modified graphical user interface (GUI) is displayed on a visible portion of the display panel, the modified GUI, being sized based on the visible portion of the display panel, to provide access to features on the display panel;
      while the display panel is fully extended out from the body, a full size GUI is displayed on the display panel; and
      the display panel is rotatable relative to the base plate and the input device is rotatable relative to the display panel.

14. The control panel assembly of claim 13, wherein:
   the input device comprises a mounting plate that is rotatably coupled to a body of the input device; and
   the display panel comprises a recess to accommodate the mounting plate, the mounting plate to be removably attached to the display panel at the recess, wherein the recess is to be covered by a cover when the input device is not coupled to the display panel.

15. The control panel assembly of claim 13, wherein the input device is a keyboard, a keypad, a touch pad, a touch screen display panel, a network device, a base for a hardware device, or a combination thereof.

16. An imaging device comprising:
   a body having a recess; and
   a control panel assembly slideably coupled to the body, the control panel assembly comprising:
      a base plate slideably coupled to the body to extend from the recess of the body;
      a display panel rotatably coupled to the base plate, the display panel comprising a mounting assembly rotatably coupled to the display panel via a first hinge, wherein:
         the display panel is removably attached to the base plate via the mounting assembly;
         while the display panel is partially retracted in the body, a modified graphical user interface (GUI) is displayed on a visible portion of the display panel, the modified GUI, being sized based on the visible portion of the display panel, to provide access to features on the display panel; and
         while the display panel is fully extended out from the body, a full size GUI is displayed on the display panel; and
      an input device rotatably coupled to the display panel, the input device comprising a mounting plate rotatably coupled to the input device via a second hinge, wherein the input device is removably attached to the display panel via the mounting plate.

17. The imaging device of claim 16, wherein the input device is rotatable to be positioned in an extended position, in which the input device is extended at a certain angular range relative to the display panel, and a retracted position, in which the input device is stowed adjacent to a front surface of the display panel or a rear surface of the display panel.

18. The imaging device of claim 16, wherein the display panel comprises a second recess to accommodate the mounting plate, the mounting plate to be removably attached to the display panel at the second recess, wherein the second recess is to be covered by a cover when the input device is not coupled to the display panel.

* * * * *